United States Patent [19]

Michel

[11] Patent Number: 4,677,293
[45] Date of Patent: Jun. 30, 1987

[54] PHOTOELECTRIC MEASURING SYSTEM

[75] Inventor: Dieter Michel, Traunstein, Fed. Rep. of Germany

[73] Assignee: Dr. Johannes Heidenhain GmbH, Traunreut, Fed. Rep. of Germany

[21] Appl. No.: 728,182

[22] Filed: Apr. 29, 1985

[30] Foreign Application Priority Data

May 8, 1984 [DE] Fed. Rep. of Germany ....... 3416864

[51] Int. Cl.$^4$ ................................................ H01J 3/14
[52] U.S. Cl. .............................. 250/237 G; 356/374; 356/375
[58] Field of Search .......................... 33/125 A, 125 C; 250/237 G; 324/175; 356/374, 395, 373, 375

[56] References Cited

U.S. PATENT DOCUMENTS

| 4,078,173 | 3/1978 | Fultz | 356/375 X |
| 4,332,473 | 6/1982 | Ono | 250/237 G X |
| 4,385,836 | 5/1983 | Schmitt | 356/374 |
| 4,461,083 | 7/1984 | Ernst | 33/125 C |

FOREIGN PATENT DOCUMENTS 2207132  8/1973  Fed. Rep. of Germany ... 250/237 G

Primary Examiner—Eugene R. LaRoche
Assistant Examiner—Steven J. Mottola
Attorney, Agent, or Firm—Willian Brinks Olds Hofer Gilson & Lione Ltd.

[57] ABSTRACT

A photoelectric measuring system includes a graduation field in the form of a phase grid. An outer field is provided for the graduation field, and this outer field is likewise formed as a phase grid. The phase grids of the graduation field and the outer field have different grid constants, so that the diffraction images generated by them impinge in different places on an array of photodetectors which are circuited together antiparallel to one another. In this way a push-pull signal is generated which can be reliably evaluated and is well suited for use as a reference signal.

14 Claims, 9 Drawing Figures

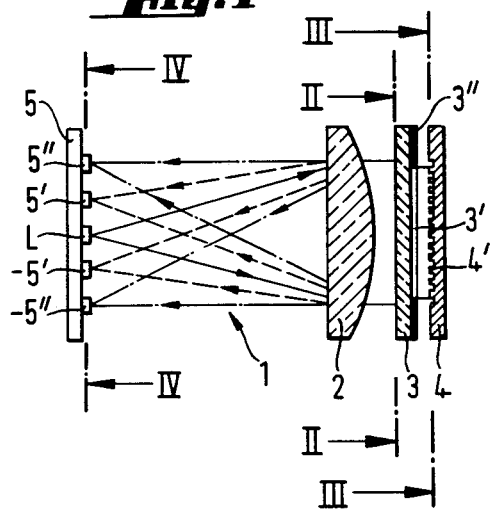
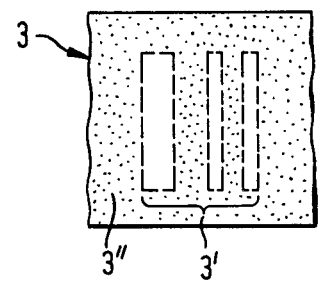
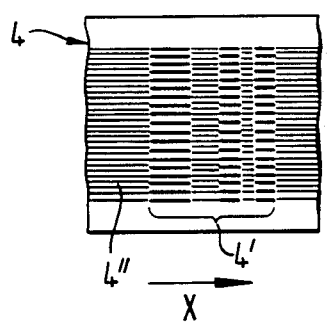
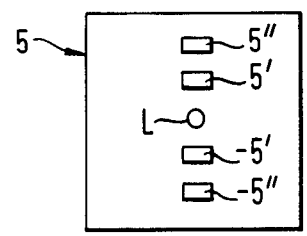
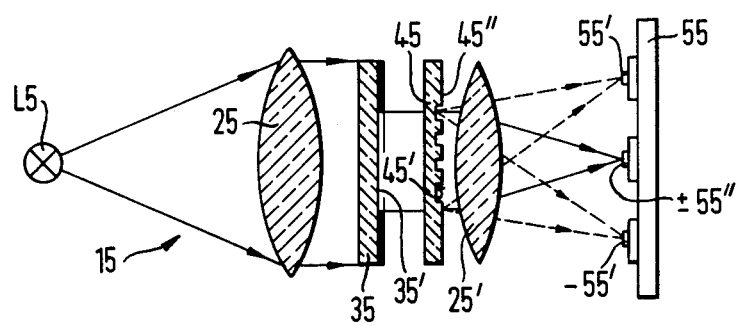

PHOTOELECTRIC MEASURING SYSTEM

BACKGROUND OF THE INVENTION

The present invention relates to position measuring systems of the type comprising at least one illuminating arrangement, a scanning unit, a graduation carrier which defines at least one graduation field, at least one photodetector for generating a signal in response to light from the illuminating arrangement modulated by the scanning plate and the graduation field, and an evaluating circuit for evaluating the signal.

Such measuring systems are commonly used in incremental length or angle measuring systems. Typically, a system is provided for reproducing a measuring system zero point in a reliable manner.

German DE-OS 18 14 785 describes the structure of a reference mark and a system for generating a reference pulse in response to this reference mark.

A sufficiently exact reference pulse can be derived from such a reference mark however, only if the scanning distance is maintained at a small value. When small scanning distances are used, the scanning distance is subject to correspondingly close tolerances with respect to scanning distance fluctuations.

The photo-electric scanning of such prior art reference marks generates one beat (Eintakt) signals. In order to obtain the push-pull or pseudo-push-pull signals required for reliable evaluation it is common practice to provide two reference marks or a reference mark and a field (such as a mirror) to generate a single reference signal. In the event the reference marks are fouled to differing degrees or in the event of distance variations in the scanning of the separate reference marks, the generated photo-electric signal can change in such a way as to prevent reliable evaluation of the reference signal.

Furthermore, prior art reference marks of the type described above do not include encoding within the graduation field in order to make one reference mark distinguishable from another.

German DE-OS 23 16 248 describes a photo-electric position marking system that operates with phase grids, which allow a larger scanning distance between the two grids which are shiftable with respect to one another. Corresponding reductions in sensitivity to scanning distance variations are thereby obtained. This document however provides no suggestion as to how a reference mark can be scanned and evaluated in a sufficiently reliable manner.

SUMMARY OF THE INVENTION

The present invention is directed to a photo-electric signal generating system for a measuring instrument, in which the tolerances for fluctuations of the scanning distance can be increased, in which a relatively large scanning distance can be used, and which can be used to generate reference pulses which are, if necessary, encoded.

According to this invention, a measuring system of the type described initially above is provided with at least one first phase grid associated with the graduation field and operative to generate refraction images when illuminated by the illuminating arrangement. A plurality of additional photodetectors are positioned with respect to the first phase grid to detect respective ones of the refraction images. The positions of the additional photodetectors are determined by optical parameters such as the wavelength of light produced by the illuminating arrangement and the grid constant of the first phase grid.

The present invention provides important advantages in that it allows scanning a reference mark with a relatively large scanning distance, which is correspondingly relative insensitive to scanning distance variations. Furthermore, this invention makes it possible to encode individual reference marks so that they are distinguishable from one another.

The invention itself, together with further objects and attendant advantages, will best be understood by reference to the following detailed description, taken in conjunction with the accompanying drawings.

BRIEF DESCRIPTION OF THE DRAWINGS

FIG. 1 is a schematic representation of a measuring system operating according to the incident light method, which incorporates a first preferred embodiment of this invention.

FIG. 2 is a partial view taken along line 2—2 of FIG. 1, showing the scanning plate.

FIG. 3 is a partial view taken along line 3—3 of FIG. 1, showing the phase grid.

FIG. 4 is a view taken along line 4—4 of FIG. 1, showing the plurality of photodetectors.

FIG. 5 is a side view of a measuring system operating according to the transmitted light principle, which incorporates a second preferred embodiment of this invention.

DETAILED DESCRIPTION OF THE PRESENTLY PREFERRED EMBODIMENTS

Figure 6:
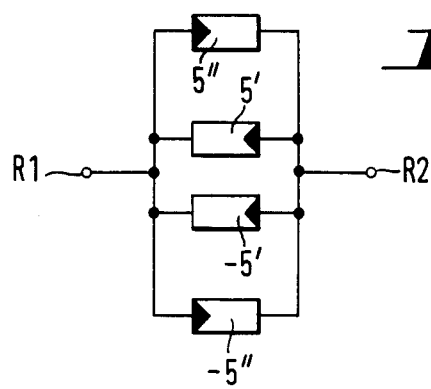
FIG. 6 is a circuit diagram showing interconnections between the photodetectors of the embodiment of FIGS. 1 to 4.

Turning now to the drawings, FIG. 1 is a schematic side view of a measuring system 1 which operates according to the incident light principle. This measuring system 1 includes a light souce L which projects light via a condenser 2 onto a scanning plate 3. As shown in FIG. 2, the scanning plate 3 defines a graduation field 3' which is made up of a group of transparent zones. The graduation field 3' is surrounded by an outer field 3" which is light absorbent. In FIG. 2 the graduation field 3' is shaped as a reference mark. However, in alternate embodiments the graduation field 3' may be constructed as a periodic graduation or incremental scale. This alternate is of particular interest in conventional scales (incident-light or transmitted-light amplitude grids) when so-called one field push-pull scanning is to be performed in order to generate qualitatively higher value signals.

Light passing through the scanning plate 3 impinges upon a reflecting incident-light phase grid 4 which reflects and refracts the incident light. Light refracted by the incident light phase grid 4 is thrown back through the scanning plate 3 and the condenser 2 and falls back upon a plate 5, on which there are arranged photodetectors 5', −5', 5", −5".

As shown in FIG. 3, the incident-light phase grid 4 defines a graduation field 4' which is shaped like the graduation field 3' of the scanning plate 3. The graduation field 4' is constructed as a phase grid with a grid constant of 10μ. The phase grid 4 also defines an outer field 4" which is likewise constructed as a phase grid but has a grid constant of only 4μ. The differing grid constants of the phase grids of the graduation field 4' and the outer field 4" lead to different refraction patterns which results in different refraction images on the plate 5 and on the photodetectors 5', −5', 5", −5". As shown in FIG. 3, the furrows and steps of the phase grids run in the measuring direction X.

With respect to FIG. 1, the measuring direction X runs perpendicular to the plane of the drawing.

In accordance with the degree of coverage or overlap between the graduation fields 3' and 4' of the scanning plate 3 and the phase grid 4, light is reflected and diffracted in the direction of the positive and negative refraction orders and focused by the condenser 2. In this explanation only first order refraction images are considered. In the focal plane of the condenser 2 there arise first order refraction images, symmetrically positioned with respect to the light source L. In the focal plane of the condenser 2 there is arranged the plate 5, and the photodetectors 5', −5', 5", −5" are positioned in such a way that the diffraction images of first order of the respective phase grids 4', 4" strike the photodetectors exactly.

Aside from the wavelength λ of the light used, the position of the diffraction images can be varied in position by constructing the phase grid correspondingly, as will be explained below in greater detail in conjunction with other embodiments.

FIG. 5 schematically shows a second embodiment of this invention having a corresponding mode of operation but which operates according to the transmitted light principle.

In FIG. 5, radiation of a light source L5 is directed through a condenser 25 upon a scanning plate 35 that defines a graduation field 35'. A further graduation field 45' is defined by a phase grid 45. A reproducing optical system 25' focuses the diffraction images of the light source L5 on a plane corresponding to that of a plate 55. An array of photodetectors 55', −55', 55", −55" are positioned properly on the plate 55 to detect these diffraction images.

If in alternate embodiments (not shown) a phase grid 45 is allocated only to the graduation field 45' and not to the outer field 45" (or vice versa) certain photodetectors can be eliminated. Such variations will be apparent to those skilled in the art and do not depart from the general scope of this invention.

The photodetectors 5', −5', 5", −5" are preferably circuited in pairs and antiparallel with one another in the manner of the circuit diagram of FIG. 6.

Figure 7:
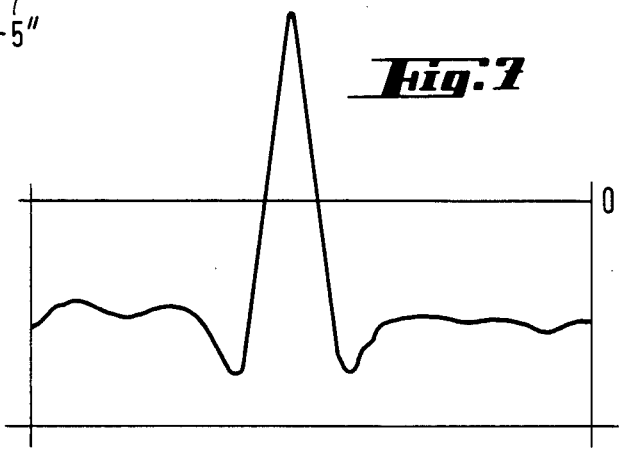
FIG. 7 is a typical signal wave form of a reference mark push-pull signal generated with the embodiment of FIG. 1.

FIG. 7 shows a typical wave form produced by either the embodiment of FIGS. 1-4 or the embodiment of FIG. 5, showing a push-pull signal corresponding to a reference mark. This signal can be measured for example at the points R1, R2 of the circuit shown in FIG. 6, and can readily be evaluated, since there is a high signal to noise ratio. Furthermore, in the event that the scanning distance is other than optimal or the optical components have been fouled, this signal is altered substantially symmetrically with respect to the zero line in amplitude.

Separate reference marks can be constructed from different line grids in order to encode the identity of the individual reference marks.

The phase grids 4', 4" of FIG. 3 generate respective associated diffraction images which strike the photodetectors ±5', ±5" at different places. Therefore, with the parallel alignment shown for the phase grids 4', 4" by determining which particular photodetector ±5', ± −5' is illuminated it can be clearly determined which phase grid 4', 4" is responsible for the particular diffraction image being measured.

One variant of the phase grid shown in FIG. 3 is that of a rectangular profile phase grid with different grid constants for the graduation field 4' and the outer field 4", with the same parallel alignment for both.

Figure 8:
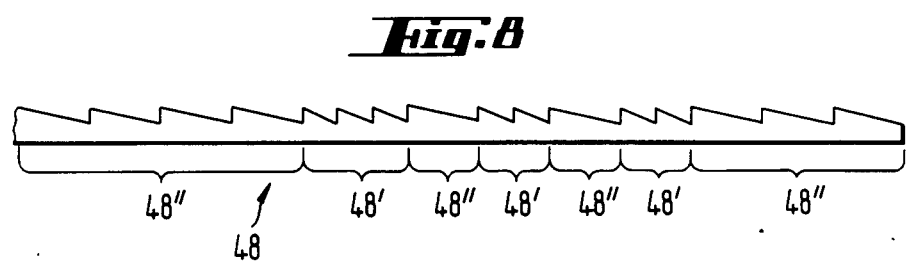
FIG. 8 is a cross section of an echelette phase grid having different grid constants.

FIG. 8 shows in cross section a further variant which utilizes an echelette phase grid, in which the graduation field 48' and the outer field 48" have different grid constants and/or alignment. The diffraction images of the illuminating unit are deflected in accordance with the optical parameters of the individual fields, and photodetectors associated with the individual diffraction images are correspondingly placed. In this way, individual ones of the reference marks can be encoded and distinguished one from another by sensing the signal generated by corresponding ones of the photodetectors.

Figure 9:
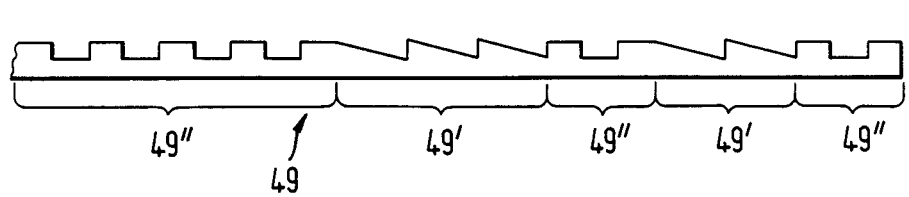
FIG. 9 is a cross section of a combination of a rectangular phase grid with an echelette phase grid.

FIG. 9 shows a further variant in which rectangular phase grids are combined with echelette phase grids of like or different grid constants for the graduation and the outer field. As above, in this case it is possible to make the alignments of the phase grids different from one another.

The particular details of structure of the phase grids can readily be selected and combined by one skilled in the art in accordance with the requirement of a particular application. Of particular importance in many applications is the reciprocal alignment of the phase grids. This is because by varying the alignment of the phase grids one to another and by correspondingly placing the associated photodetectors, encoding of the individual reference marks is made particularly straightforward.

Grid theory can be used to determine the proper placement of photodetectors associated with each of the respective diffraction images. For example, the 1978 dissertation of J. Wilhelm entitled "Dreigitter- schrittgeber- photoelektrische Aufnehmer zur Messung Von Lageanderungen" (TU Hannover) treats the subject of grid theory thoroughly. As discussed in page 12 of this publication, the diffraction formula reads as follows:

$$\sin \alpha = \frac{k \cdot \lambda}{d}$$

in which k is the order number, λ the wavelength and d the grid constant.

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents, which are intended to define the scope of the invention.

I claim:

1. In a position measuring system of the type comprising at least one illuminating arrangement, a scanning plate, a graduation carrier which defines at least one graduation field, and at least one photodetector for generating a signal in response to light from the illuminating arrangement modulated by the scanning plate and the graduation field, the improvement comprising:

at least one first phase grid associated with the graduation field and operative to generate diffraction images when illuminated by the illuminating arrangement; and a plurality of additional photodetectors positioned with respect to the first phase grid to detect respective ones of the diffraction images, wherein the positions of the additional photodetectors are determined by the wavelength of light produced by the illuminating arrangement and the grid constant of the first phase grid.

2. The invention of claim 1 wherein the first phase grid defines a reference mark on the graduation carrier.

3. The invention of claim 1 wherein the first phase grid is positioned adjacent to a second phase grid, which differs from the first phase grid in at least one optical parameter.

4. The invention of claim 3 wherein the first and second phase grids are aligned parallel to one another, wherein each of the first and second phase grids defines a respective rectangular profile, and wherein the grid constants of the first and second phase grids differ from one another.

5. The invention of claim 3 wherein the first and second phase grids are aligned parallel to one another, wherein each of the first and second phase grids comprise respective echelette phase grids, and wherein the grid constants of the first and second phase grids differ from one another.

6. The invention of claim 1 wherein each of the phase grids comprises a rectangular profile portion and an echelette profile portion.

7. The invention of claim 3 wherein the first and second phase grids differ in alignment.

8. The invention of claim 1 wherein the first phase grid comprises an incident light phase grid.

9. The invention of claim 1 wherein the first phase grid comprises a transmitted light phase grid.

10. The invention of claim 1 wherein the spacing of the photodetectors varies in accordance with the formula $$\sin \alpha = \frac{k \cdot \lambda}{d},$$

where d is the grid constant of the first phase grid, $\lambda$ is the wavelength of light from the illuminating arrangement, k is an integer, and $\alpha$ is the angular position of one of the photodetectors.

11. In an apparatus for the photoelectric generation of electrical signals in position measuring instruments of the type which comprise an illumination means, a scanning plate, and a graduation carrier comprising a graduation field, the improvement comprising:

at least one graduation marking located within the graduation field and constructed as a phase grid, the phase grid defining a set of grid parameters and an orientation with respect to the graduation carrier, the phase grid operative to diffract light from the illumination means into at least one diffraction order; and at least one photodetector operative to detect the at least one diffraction order and positioned in dependence upon at least one of (1) the phase grid orientation; (2) the grid parameters; and (3) the wavelength of the light.

12. The invention of claim 11 wherein the graduation field adjacent the graduation marking is constructed as a phase grid; and wherein the graduation field phase grid defines an orientation with respect to the graduation carrier and a set of grid parameters; and wherein at least one of the orientation and grid parameters is different from the orientation and grid parameters associated with the graduation marking.

13. The invention of claim 12 wherein the phase grids comprise a combination of rectangular profile phase grids and echelette phase grids.

14. In a position measuring instrument for measuring the relative position of two moveable objects, the measuring instrument of the type comprising illumination means and a graduation carrier, the improvement comprising:

at least one graduation field located on the graduation carrier and constructed as a phase grid, the phase grid comprising at least a first and second region, each region defining an orientation relative to the graduation carrier and a set of grid parameters wherein at least one of the orientation and grid parameters of the first region is different from at least one of the orientation and grid parameters of the second region, the first and second regions cooperating with the illumination means to produce at least a respective selected order of diffracted light with optical characteristics dependent upon the respective orientation and grid parameters; and means for detecting the diffracted light to give an indication of the relative position of the first and second objects.

* * * * *